United States Patent
Parkinson

(10) Patent No.: US 7,277,895 B2
(45) Date of Patent: Oct. 2, 2007

(54) SYSTEM AND METHOD OF PARSING A TEMPLATE FOR GENERATING PRESENTATION DATA

(75) Inventor: Dwayne Parkinson, Medford, WI (US)

(73) Assignee: ORA International, Inc., Phillips, WI (US)

( * ) Notice: Subject to any disclaimer, the term of this patent is extended or adjusted under 35 U.S.C. 154(b) by 169 days.

(21) Appl. No.: 10/647,086

(22) Filed: Aug. 22, 2003

(65) Prior Publication Data

US 2005/0049995 A1 Mar. 3, 2005

(51) Int. Cl.
*G06F 7/00* (2006.01)
(52) U.S. Cl. .......................................... 707/102; 707/7
(58) Field of Classification Search ................ 715/513; 707/10, 102, 7; 705/26; 379/34
See application file for complete search history.

(56) References Cited

U.S. PATENT DOCUMENTS

| | | | |
|---|---|---|---|
| 6,181,776 B1 * | 1/2001 | Crossley et al. | 379/32.01 |
| 6,356,903 B1 | 3/2002 | Baxter et al. | |
| 6,397,231 B1 | 5/2002 | Salisbury et al. | |
| 6,418,446 B1 | 7/2002 | Lection et al. | |
| 6,484,149 B1 * | 11/2002 | Jammes et al. | 705/26 |
| 6,678,867 B2 * | 1/2004 | Fong et al. | 715/523 |
| 6,751,736 B1 * | 6/2004 | Bowman et al. | 713/189 |
| 6,789,077 B1 | 9/2004 | Slaughter et al. | |
| 2003/0110058 A1 | 6/2003 | Fagan et al. | |
| 2004/0230901 A1 * | 11/2004 | Godwin et al. | 715/513 |

OTHER PUBLICATIONS

Torsten Gipp and Jurgen Ebert, "Conceptual Moedlling and Web Site Generation Using Graph Technology," Apr. 2001, *University Koblenz-Landau, Institute for Informatics*, Rheinau 1, D-56075 Koblenz.
Sudarshan S. Chawathe, "Describing and Manipulating XML Data," 1999, Department of Computer Science, University of Maryland, College Park. MD 20904.
Ora Lassila and Ralph R. Swick, "Resource Description Framework (RDF) Model and Syntax," Feb. 16, 1998.
Jeen Broekstra and Arjohn Kampman, "Sesame: A Generic Architecture for Storing and Querying RDF and RDF Schema," Oct. 1, 2001.

(Continued)

*Primary Examiner*—Sathyanarayan Pannala
(74) *Attorney, Agent, or Firm*—Charles A. Lemaire; Lemaire Patent Law Firm, P.L.L.C.

(57) ABSTRACT

A system and method performed by the system is disclosed. In some embodiments, a template is parsed to identify a set of elements that form a unique key, where the set of elements includes a group name, subgroup name, and sequence element. A value is retrieved from a data store using the unique key. Presentation data is generated from the template by replacing the set of elements with the retrieved value. In an alternative embodiment, a system and method for updating a data store is disclosed. A messaging-framework message received from a client is parsed to identify a set of elements that form a unique key and associated update value. A value is updated in the data store with the identified value using the unique key to uniquely select a particular value from the data store for updating. An information system that generates presentation data and updates a data store is also disclosed.

21 Claims, 7 Drawing Sheets

OTHER PUBLICATIONS

Arjohn Kampman, "Communicating With Sesame," Jul. 24, 2002.

Gipp, T. and Ebert, J, "*Conceptual Modelling and Web Site Generation Using Graph Technology*," Apr. 2001, 14 pages, University Koblenz-Landau, Institute for Informatics, Rheinau 1, D-56075 Koblenz, Germany.

Chawathe, S., "*Describing and Manipulating XML Data*," 1999, 7 pages, Department of Computer Science, University of Maryland, College Park, MD.

Lassila, O. and Swick, R.R., "Resource Description Framework (RDF) Model and Syntax; W3C Working Draft Feb. 16, 1998," [online]. W3C RDF Model and Syntax Working Group, 1998 [retrieval date unknown]. Retrieved from the Internet: <URL: http://www.w3.org/TR/1998/WD-rdf.syntax-19980216.

Broekstra, J. and Kampman A., "*Sesame: A Generic Architecture for Storing and Querying RDF and RDF Schema*," Oct. 1, 2001, 24 pages, Aidministrator Nederland b.v., 3817 CS Amersfoort, The Netherlands.

Kampman, A., "*Communicating with Sesame*," Jul. 24, 2002, 7 pages, Aidministrator Nederland b.v., 3817 CS Amersfoort, The Netherlands.

Rapoza, J., *Web content management face-off Review: Six systems span capability spectrum; the challenge is finding just the right one eWeek* (Aug. 2, 2004), pp. 33-41, Ziff-Davis, N.Y. NY.

* cited by examiner

SYSTEM AND METHOD OF PARSING A TEMPLATE FOR GENERATING PRESENTATION DATA

FIELD OF THE INVENTION

Embodiments of the present invention relate to systems and methods that include information storage, retrieval, and update via a browser.

BACKGROUND OF THE INVENTION

Browsing conventionally includes searching, accessing, and viewing information stored and provided by an information system without necessarily knowing of the existence or the format of the information being sought. A conventional browser includes a program performed on a client computer that is coupled via a network to one or more information systems acting as servers. Such a browser may have facilities to accept information from a principal (e.g., a human user or other software such as an operating system, agent, or daemon) and provide that information for storage on the information system. For example, a user may browse product advertising provided by an information system and then enter a transaction to specify a purchase order for particular products directed to a suitable information system. The browser converts messages from the server for display to the user; and, converts selections and inputs from the user into messages for presentation to the server. Conventional networks permit documents from the server to be provided in a markup language. Messages in a conventional network conform to a transport protocol. For example, when clients and servers are coupled to the Internet or World Wide Web, messages to the client include documents in Hypertext Markup Language (HTML); and, messages between the client and the server conform to HyperText Transport Protocol (HTTP).

An HTML document for a particular transaction may include software facilitating transfer of information to the server according to a POST command of HTTP. Generally, the POST command is customized for each data transfer operation due in part to particulars of the data storage mechanism designed for this transaction and hosted by the server. Consider, for example, a web page that provides a book order form. The form may include a list of titles and prices offered for sale using elements specific to the server, such as, BookTitle and BookPrice. The mechanism engaged to submit the order generally constructs a POST command reciting elements that are specific to the server, such as, BookTitle and QuantityRequested. The process at the server that accepts the order must recognize the elements provided in the POST command, such as, BookTitle=Gardening and QuantityRequested=2.

What is needed is a system and method for providing and updating information that is less dependent on elements specific to the manner in which information is accessed on the server. By providing an access technique according to various aspects of the present invention, custom programming for the server may be reduced or eliminated. Such custom programming includes the design of web pages that provide information to a user and the design of web pages and software for accepting information from the user. Without the systems and methods of the present invention, cost savings for web page design and maintenance will go unrealized; and information provided by users of a first group will not be provided in a timely manner to users of a second group due to the need for custom programming to be installed to automatically link the two.

SUMMARY OF THE INVENTION

A system, according to various aspects of the present invention, updates a record of a store; and, includes a compose process and a decompose process. The compose process composes a page to be sent via a network. The page includes a start tag having an attribute value wherein the attribute value includes a value name. As desired, the page may further include a named value recalled from the record of the store. The decompose process decomposes a message received via the network. The message includes indicia of the value name and a replacement value. The decompose process further updates the named value of the record in accordance with the replacement value, the record being accessed in accordance with the indicia of the value name.

A method, according to various aspects of the present invention, is performed by a server for updating a store. The method includes, in any order: (a) parsing a template according to a markup language, the markup language having a start tag that includes an attribute value, parsing being performed to determine a value name from the attribute value; (b) preparing a key that includes the value name; (c) preparing a request having a portion of the template after substituting the key for at least the attribute value; (d) parsing a message having the key and an update value; and (e) updating the store at a record accessed in accordance with the key.

By passing information sufficient to locate a record in the store as an attribute value of a start tag of a markup language, conventional Internet technology can prepare a message sent back to the server that includes such information (e.g., as a parameter name) and an update value. For instance, when the message is received as produced by the POST method of HTTP, the parameter names for each such method need not be customized for each data transfer operation to reflect particulars of the data storage mechanism designed for this transaction and hosted by the server.

BRIEF DESCRIPTION OF THE DRAWING

Embodiments of the present invention will now be further described with reference to the drawing, wherein like designations denote like elements, and.

DETAILED DESCRIPTION OF THE PREFERRED EMBODIMENTS

Figure 1:
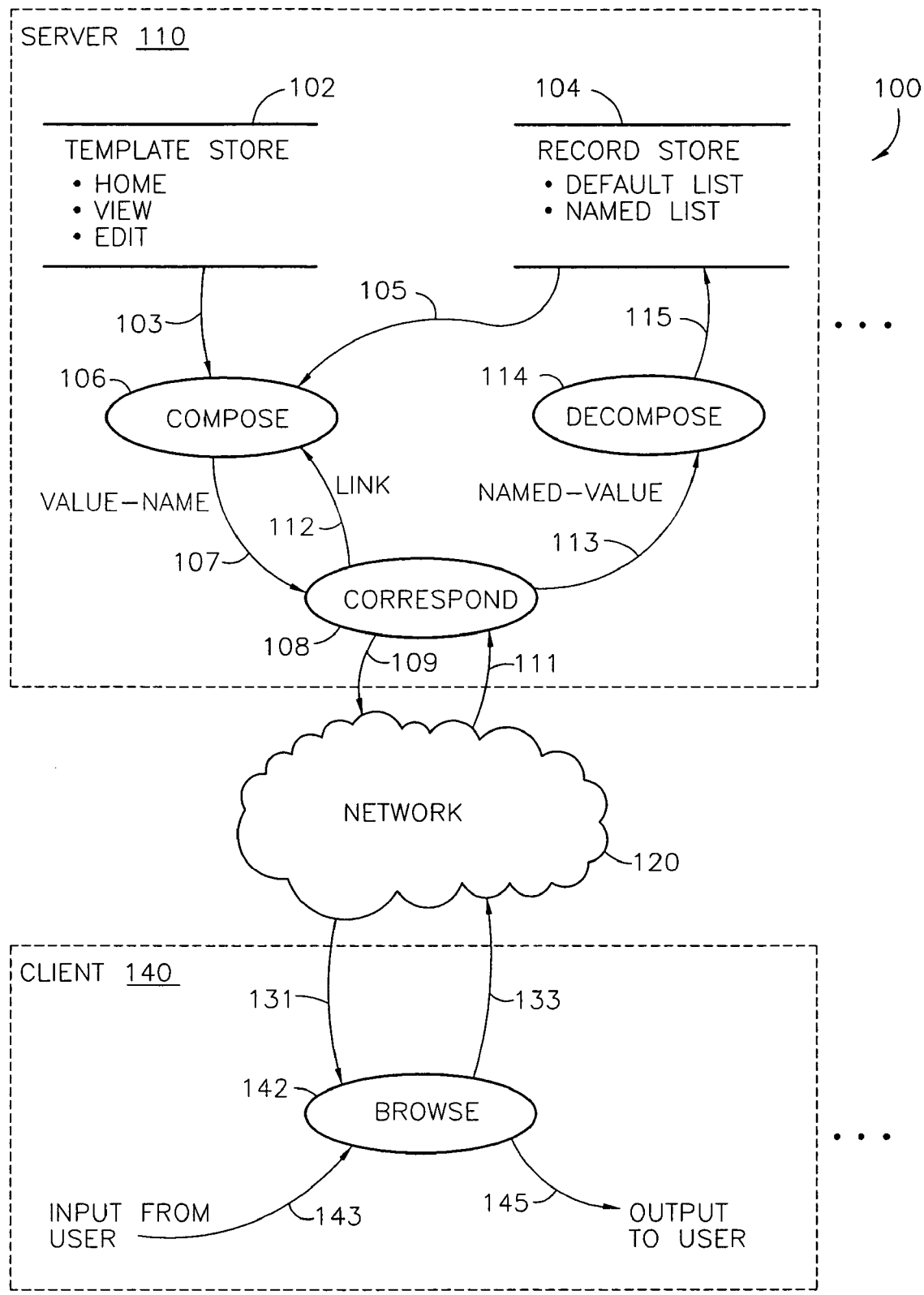
FIG. 1 is a data flow diagram of cooperation between a server and client according to various aspects of a system of the present invention.

Systems and methods according to various aspects of the present invention solve the problems discussed above and provide a relatively inexpensive mechanism for providing information to users and allowing users to update information. These systems and methods provide improved ways for accessing updated records from a record store hosted by a source of information. A source of information generally includes one or more servers capable of communicating via a network to one or more clients. Each client generally includes a conventional browser. The network may include any conventional network comprising wired or wireless links and any implementation of conventional network services including network formation (e.g., registered nodes and ad hoc formation), data storage, data processing, message routing, fail-over, mirroring, and load sharing. Both servers and clients may be implemented using any conventional computers, including office desk-top computers. In one implementation, the network is simply point-to-point between one server and one client. For example, system 100 of FIGS. 1 through 7 includes server 110, network 120, and client 140 coupled for communication with server 110 via network 120.

Server 110 performs compose process 106, correspond process 108, and decompose process 114. Server 110 maintains template store 102 for storage of templates; and record store 104 for storage of information to and from clients. Server 110 suitably includes a processor, memory, network interfaces, and storage peripherals for performing an operating system and application programs. An operating system typically provides a conventional protocol stack for communication via a network. In alternative implementations according to various aspects of the present invention server 110 hosts storage (102, 104), network interfaces, and performs processes (106, 108, 114, and applications) with any number of processors and instances of these processes cooperating in a multitasking, multithreaded, network environment. Storage, networking, and application program execution functions according to the present invention may be distributed among any number of conventional servers. A server also suitably manages numerous independent client-server sessions.

Client 140 performs browse process 142 that receives input 143 from a user and provides output 145 to a user. Client 140 suitably includes a keyboard and pointing device for receiving input 143 and may include a monitor, printer, and sound system for providing output 145. Client 140 may further include a processor, memory, network interface, and storage peripherals for performing an operating system and application programs. The operating system suitably provides a conventional protocol stack for communication via the network. In alternative implementations according to various aspects of the present invention client 140 hosts storage, network interfaces, and performs processes (142 and applications) with any number of processors and instances of these processes cooperating in a multitasking, multithreaded, network environment.

On request from browse process 142, server 110 provides information to client 140 for display by browse process 142 to the user. Information may be organized in pages. Each page may correspond to a file stored on server 110 that is downloaded to browse process 142. The user's initial request may be satisfied with a home page having hypertext links to other pages. In response to the user's input to follow a hypertext link conveyed by browse process 142, server 110 provides a page for display associated with the hypertext link. The provided page may have further different hypertext links. A hypertext link may be indicated on a page in any conventional manner. A collection of pages is called a site when the collection is generally from a single source of information (regardless of number and location of servers), contains links to other pages of the set, and generally conforms to a consistent presentation of content. Further, a page may include an entry/edit portion for a user to enter and edit text to be provided to the server. Such text may alternatively identify one or more files to be transferred (uploaded) by browse process 142 to server 110.

To permit variation in client capabilities relating to the presentation of information, communication between a server and a client via a network conventionally includes conveying data describing content (e.g., content data) separate from conveying data describing how the content is to be presented (e.g., presentation data). The separation may be implemented with any conventional communication diversity. The association of particular presentation data with particular content data may also be implemented by any conventional communication technique. In a preferred implementation, message structures provide time diversity and data association wherein presentation data precedes content data in a unit of information on the same channel. The unit may be communicated in any number of packets and/or messages received in any order and then organized so that presentation data is conveniently read before content data. To permit presentation to be described generally for the entire content of the unit and presentation to be described for particular portions of the content of the unit, any conventional syntax or semantics may be conveyed with the descriptions. For example, the syntax and semantics of a markup language may be used. A markup language generally includes tags to describe presentation. The tags are syntactically recognizable when mixed with content. Tags include attributes having values.

Particular information sufficient to access a record of record store 104 (herein called a key) is provided for use by browse process 142 in a manner that facilitates storage and access of updated information in record store 104. A key may include a key-name and/or a key-value. Using a fully qualified key-value may provide access to one record. Using a partially qualified key-value may provide access to more than one record (e.g., a group or subgroup).

Updates are typically made according to information provided by a user of client 140 and transferred from browse process 142 to server 110 according to a command syntax and semantics. According to various aspects of the present invention, a key is transferred from server 110 to browse process 142 so as not to interfere with presentation of content (e.g., the key-value within a tag as an attribute-name); then, the key with updated information is transferred from browse process 142 to server 110 in a conventional transfer protocol. A key with updated information may be transferred to server 110 by: (a) a parameter-name that includes a key-value; and (b) a parameter-value that specifies update information for the record(s) accessed using the key-value.

For clarity of discussion of various aspects of the present invention, presentation and content will be described as conveyed by a network 120 according to a markup language. A concise definition of the markup language is presented in Table 1. The symbol "," means "followed by"; the symbol ". . ." means repetition of the preceding item; the symbol "|" means "or"; and brackets "[ ]" enclose optional items.

TABLE 1

| Definition | Comment |
| --- | --- |
| document :: head-element, body-element | The head element precedes the body element. |
| head-element :: head-start-tag, document-element . . . , head-end-tag | The head element describes presentation. Some types of document-element are legal only in the head-element, however that distinction in this concise definition is omitted for clarity. |
| body-element :: body-start-tag, document-element . . . , body-end-tag | The body element describes content. Some types of document-element are legal only in the body-element, however that distinction in this concise definition is omitted for clarity. |
| document-element :: standalone-element\|paired-element | The syntax of an end-tag may be used to distinguish the standalone-element from the paired-element. |
| standalone-element :: start-tag | A tag and its associated attribute-and-value tuples may be enclosed in syntax such as "<>" as used in XML and HTML. |
| paired-element :: start-tag, (text\|document-element), end-tag | In a document-element that is located in the body-element, the text between corresponding start and end tags typically provides the content of the document. |
| start-tag :: tag-name, attribute-and-value . . . | Generally, the semantics includes particular attribute-names reserved for use with particular tag-names. For example, a conventional INPUT tag may include a name attribute that identifies the name of a parameter to receive a value provided by the user. Other tags may use other named attributes to control other functions of the browser. |
| end-tag :: tag-name | An end-tag may have syntax (e.g., a slash character) to distinguish it from a start-tag. |
| attribute-and-value :: attribute-name, attribute-value | For readability, the attribute name and attribute value may be associated with syntax (e.g., an equal sign following the attribute-name). |
| attribute-value :: text | For readability, the text may be enclosed in syntax (e.g., "quoted text"). |

Template store 102 and record store 104 may be organized using any conventional storage software and hardware. For example, templates of template store 102 may be stored, one template per file, in a conventional file system having a pathname evaluated by an operating system to locate each template. Each template may conform to a markup language. Records in record store 104 may be defined and stored as text in a markup language. Access may be accomplished by conventional text searching and parsing of the markup language. In another implementation, a model of the type described in Document Object Model (DOM) Level 1 Specification produced by World Wide Web Consortium (W3C) (Massachusetts Institute of Technology, Institut National de Recherche en Informatique et en Automatique, Keio University) is used. A DOM may be accessed according to a directory access protocol, for example, of the type described by T. Howes and M. Smith, "LDAP: Programming Directory-enabled Applications with Lightweight Directory Access Protocol," Macmillan Technical Publishing, 1997. Alternatively, records may be defined, stored, and accessed using any conventional relational database management system.

A compose process according to various aspects of the present invention, includes any process that prepares a page for use by a client in accordance with a template, named-values, and substitution. Many aspects of a page are typically predefined according to one or more templates that define presentation and content of the page. For example, compose process 106 (activated by each link 112 received from correspond process 108) reads a suitable template 103 from template store 102, prepares a respective page 107, and provides the page to correspond process 108. In preparing the page 107, compose process 106 accesses record store 104 to retrieve named-values 105. The output page 107 typically includes the presentation and content as described by the template 102 with portions of the template replaced by substitution. In preferred implementations, named-values 105 are substituted for markup elements and/or attributes that make reference to records of store 104.

A template may include data in a markup language compatible with browse process 142 and include additional information. The additional information may be used by compose process 106 to simplify referring to data in record store 104. In a preferred implementation, the additional information (beyond the capability of the browse process's markup language defined in Table 1) is defined in an extended markup language. Any template stored in template store 102, therefore, may include elements of the extended markup language. Preferably, each template of store 102 is stored in one file and conforms to the extended markup language. The extended markup language is herein called a Dynamic Substitution Semantics (DSS) language, a concise definition of which is presented in Table 2. In one implementation, the extended markup language is consistent with the conventional markup language XML so as to include tags consistent with HTML and tags defined herein. When browse process 142 is compatible only with the markup language HTML, compose process translates nonconforming tags into semantics compatible with HTML.

TABLE 2

| Definition | Comment |
| --- | --- |
| DSS-document :: (DSS-head-element, DSS-body-element . . . ) . . . | A DSS-head-element provides a context for the following DSS-body-element(s). |
| DSS-head-element :: DSS-head-start-tag, DSS-document-element . . . , DSS-head-end-tag | In one implementation only one DSS-head-start-tag and DSS-head-end-tag are defined. These appear respectively as "<DssData>" and "</DssData>". Some types of DSS-document-element are legal only in the DSS-head-element, however that distinction in this concise definition is omitted for clarity. |
| DSS-body-element :: DSS-body-start-tag, extended-document, DSS-body-end-tag | In one implementation only one DSS-body-start-tag and DSS-body-end-tag are defined. These appear respectively as "<DssDisplay>" and "</DssDisplay>". Some types of DSS-document-element are legal only in the body-element, however that distinction in this concise definition is omitted for clarity. |
| extended-document :: ([text], DSS-document-element) . . . , [text] | An extended-document is a document as defined in Table 1 further comprising a DSS-document-element at any place where a document-element, an attribute-value, or text may appear. Parsing for DSS-document-elements is preferably implemented with regard to the syntax of a document as defined in Table 1 but without regard for the semantics of such a document. |
| DSS-document-element :: DSS-standalone-element\| DSS-paired-element\| document-element | A DSS-document-element may be a document-element as defined in Table 1. The syntax of an end-tag may be used to distinguish the standalone-element from the paired-element. |
| DSS-standalone-element :: DSS-start-tag | Standalone elements in one implementation include tags named "DssFile", "DssItem", and "DssItem@". A tag and its associated attribute-and-value tuples may be enclosed in syntax such as "<>" as used in XML and HTML. |
| DSS-paired-element :: DSS-start-tag, (text\|DSS-document-element), DSS-end-tag | Paired elements in one implementation include a tag named "DssItems" or "DssList". |
| DSS-start-tag :: DSS-tag-name, attribute-and-value . . . | Generally, the semantics includes particular attribute-names reserved for use with particular tag-names. Attributes for a preferred set of DSS tags are described in Table 3. The syntax and semantics for attribute-and-value are defined in Table 1. |
| DSS-end-tag :: DSS-tag-name | An end-tag may have syntax (e.g., a slash character) to distinguish it from a start-tag. |

Access to named-values stored in record store 104, according to various aspects of the present invention is facilitated by a hierarchical naming convention. Preferably, the hierarchy has three levels. In one implementation the levels are: list-name, sequence-number, and value-name. By this organization, members of a list may have any number of named-values; and named-values may be of various lengths. The organization permits a one to one relation between value-name and list member (e.g., each member has one named-value for a given value-name); and permits a many to one relation between value-name and list member (e.g., a member may have several named-values each having the same value-name). The hierarchy also permits partial specification to be resolved as a proper reference to several records. For example, specifying only a list-name and value-name will access matching records having any sequence-number. Or, specifying only a list-name and sequence-number will access matching records having any value-name.

The DSS-start-tags mentioned in Table 2 may include attributes as described in Table 3.

TABLE 3

| DSS-start-tag and its Purpose | Attribute-name | Comment |
| --- | --- | --- |
| DssData Purpose: to demarcate the dss-head-element | none | |
| DssDisplay Purpose: to demarcate the dss-body-element | none | In an alternate implementation where DssDisplay elements are included in data flows 107, 109, and 131, attributes of the DssDisplay element may provide notice to browse process 142 or to the user of client 140. Notice may include, for example, version identification of decompose process 114 and/or legal notices of proprietary rights or license terms. |
| DssFile Purpose: to identify a record store (104). | name | The name attribute identifies an information source, a filename, or a pathname. |

TABLE 3-continued

| DSS-start-tag and its Purpose | Attribute-name | Comment |
|---|---|---|
| DssItem Purpose: to specify a value for use in text substitution. | list | Identifies the portion of a key (e.g., a value matching entries in column "List-Name" of Table 4) for access to a group of records (e.g., rows 16-21) in store 104. If not specified, a default value (e.g., list = "default") may be used. |
| | sequence | Identifies the portion of a key (e.g., a value matching entries in column "Sequence-Number" of Table 4) for access to a subgroup of records (e.g., rows 18-19) in store 104. If used within a DssItems context, values for list and name may be implied from the context. |
| | name | Identifies the portion of a key (e.g., a value matching entries in column "Value-Name" of Table 4) for access to a single record (e.g., row 19) in store 104. |
| DssItem@ Purpose: to specify the name of a value for use in text substitution | list sequence name | The attributes for DssItem@ have the same purpose as similarly named attributes for DssItem. While DssItem provides access to a named value, DssItem@ constructs a value name partially or fully qualified. For example, in the animal shelter site discussed below, A DssItem@ with attribute name = "Name" in the context of a DssItems element may provide in turn "dogs__1__Name" and "dogs__2__Name" in the text substitution for DssItems. |
| DssItems Purpose: to specify an indefinite number of records (e.g., all records of a list) | list | Identifies the portion of a key (e.g., a value matching entries in column "List-Name" of Table 4) for access to a group of records (e.g., rows 16-21) in store 104. If not specified, a default value (e.g., list = "default") may be used. |
| | start | When less than all numbered subgroups (e.g., sequences) of a list are desired, no records prior to the specified start value will be accessed. |
| | size | Specifies the number of subgroups to present on one page. Typically such a page has a button (e.g., a "more" button) allowing the user to request another batch of subgroups of the same quantity as the initial number. |

A correspond process transmits a page to a client and on receipt of messages from the client provides data to a decompose process for updating a record store. For example, correspond process 108 receives a page 107 from compose process 106 and provides messages 109 to network 120 according to protocols compatible with network 120. On receipt of messages 111 from network 120, correspond process 108 provides data 113 to decompose process 114. Messages 109 and 113 may comply with network protocols (e.g., TCP/IP). For example, messages 109 may convey per HTTP a document (as defined in Table 1) corresponding to one page. Messages 111 may include user input and/or instructions to follow links as discussed above, such as conforming to an HTTP GET command. Or, messages 111 may conform to an HTTP POST command.

A decompose process receives one or more tuples from a correspond process and facilitates action on a record store, for example, to revise a value stored in the record store. Other actions may include allocating storage for a new value, setting the stored value to a default value (e.g., when the tuple includes a null value), or deallocating storage. Each tuple from the correspond process may include information sufficient to identify which value of the record store is to be acted on and information to complete the revision of that value. For each received tuple, the decompose process determines whether the named value exists in the record store, allocates suitable storage as desired, determines the name and value sufficient to locate a storage location for the named value.

For example, decompose process 114 typically receives a series of parametric expressions. A parametric expression (e.g., father=Paul) provides the name of a parameter (e.g., "father") in association with (e.g., "=" syntax) a value (e.g., "Paul") for that parameter. The parameter name is sufficient to locate the corresponding current value in record store 104. The new value may be null (e.g., indicating that the value is to be cleared), comprise a code (e.g., a reserved value indicating that storage for the value is to be deallocated), or a proper value to replace the corresponding current value. In a preferred implementation, decompose process 114 receives a tuple of the form: a_b_c=d wherein 'a', 'b', and 'c' respectively specify the group (e.g., list-name), subgroup (e.g., sequence-number), and item (e.g., value-name) for accessing a record, and 'd' specifies a replacement text value for the item. Here, the parameter name (e.g., a_b_c) is the result of concatenating portions of the hierarchical naming convention of record store 104 and an intervening symbol, "_". In other implementations any order of concatenation and any intervening symbol or no symbol may be used.

Systems and methods according to the present invention may be applied to any information system (e.g., commercial order entry, non-profit supplier of information, or any conventional application service provider (ASP) function). Merely for purposes of illustrating the advantages and operation of systems according to various aspects of the present invention and not for limiting the scope of the claimed invention in any way, a site is described herein for operation of an animal shelter.

The animal shelter site described below includes exemplary records in store 104 as described in Tables 4 and 5; and, exemplary templates in store 102 as described in Table 6. The site page plan views of FIG. 2 and FIG. 3 generally correspond to suitable templates, although text case and font size, for example, cannot be portrayed without offending patent drawing requirements. Each template may be stored individually in a text file, for example, template 200 in animalshelter.dss; a view page (not shown) for dogs in dogs.dss; and a view page for cats (not shown) in cats.dss.

A typical animal shelter site would have dozens of respective descriptions (e.g., rows 33-37 of Table 4) of dogs, cats, and other pets, though only two dogs are included herein for convenience of description of aspects of the invention. Cats and other pets may be described conveniently with more, different, or fewer details (i.e., named-values). Descriptions of similar types of pets (e.g., dogs) need not have named-values for all details. In other words, a particular description may have fewer than a full set of records (e.g., Training record omitted because extent of training cannot be determined) or some records of the set may have null values.

A record store, according to various aspects of the present invention, stores named-values. A record store may be organized logically and/or physically as records each having the same number of fields with any number of suitable indexes (if any). For example, record store 104 in one implementation includes one record for each row in Table 4. For clarity of presentation, not all records for a typical animal shelter site are shown in Table 4. Each column of Table 4 provides, in the heading row, the field-name of a field for the column and a respective field-value in each row. Groups and subgroups of records are identified by having common field-values. Records of record store 104 may be sorted and indexed in any conventional manner facilitating any unique or similar access by compose process 106 and decompose processes 114. For example, records corresponding to Table 4 include five groups (also called lists): rows 1-15, rows 16-21, rows 22-27, rows 28-32, and rows 33-43 may have any number of subgroups. For example, the group of records corresponding to rows 33-43 has two subgroups: rows 33-37 and 38-43. Subgroups of the same group may have different quantities of records. A field-value may be any data item including: literal text (e.g., rows 1-3 of Table 4), a name of a file existing on the server (e.g., rows 4 and 21), or a reference to another group, subgroup, or item (e.g., rows 14 and 15).

TABLE 4

| Row | List-Name | Sequence-Number | Value-Name | Named-Value |
|---|---|---|---|---|
| 1 | default | 0 | BGColor | white |
| 2 | default | 0 | Font | Arial |
| 3 | default | 0 | ShelterName | Taylor County Animal Shelter |
| 4 | default | 0 | Logo | logo.jpg |
| 5 | default | 0 | Address1 | 123 Main |
| 6 | default | 0 | Address2 | P.O. Box 569 |
| 7 | default | 0 | CityStateZip | Medford, WI 54451 |
| 8 | default | 0 | Phone | (715) 748-1234 |
| 9 | default | 0 | Email | pets@generic.com |
| 10 | default | 0 | Hours | Mon-Fri 8 to 5 |

TABLE 4-continued

| Row | List-Name | Sequence-Number | Value-Name | Named-Value |
|---|---|---|---|---|
| 11 | default | 0 | WelcomeMsg | Visit us at the Mall. Donations welcome! |
| 12 | default | 0 | Title | Pet Of The Week |
| 13 | default | 0 | PrizePetLink | http://127.0.0.1/cgi-bin/dss/dss.pl?PrizePetEdit.dss |
| 14 | default | 0 | PrizePetList | dogs |
| 15 | default | 0 | PrizePetSeq | 2 |
| 16 | navigation | 1 | MenuItem | Home |
| 17 | navigation | 1 | MenuReference | animalshelter.dss |
| 18 | navigation | 2 | MenuItem | Dogs |
| 19 | navigation | 2 | MenuReference | dogs.dss |
| 20 | navigation | 3 | MenuItem | Cats |
| 21 | navigation | 3 | MenuReference | cats.dss |
| 22 | dogsdetails | 1 | Detail | Name |
| 23 | dogsdetails | 2 | Detail | Breed |
| 24 | dogsdetails | 3 | Detail | Age |
| 25 | dogsdetails | 4 | Detail | Text |
| 26 | dogsdetails | 5 | Detail | Image |
| 27 | dogsdetails | 6 | Detail | Training |
| 28 | catsdetails | 1 | Detail | Name |
| 29 | catsdetails | 2 | Detail | Breed |
| 30 | catsdetails | 3 | Detail | Age |
| 31 | catsdetails | 4 | Detail | Text |
| 32 | catsdetails | 5 | Detail | Image |
| 33 | dogs | 1 | Name | Bubba |
| 34 | dogs | 1 | Breed | Mix |
| 35 | dogs | 1 | Age | 3 Months |
| 36 | dogs | 1 | Text | Bubba is a happy little dog who LOVES to play. He's very affectionate. He doesn't bark and sheds very little. |
| 37 | dogs | 1 | Image | dog1.jpg |
| 38 | dogs | 2 | Name | Jake |
| 39 | dogs | 2 | Breed | Black Labrador |
| 40 | dogs | 2 | Age | 1 Year |
| 41 | dogs | 2 | Text | Jake loves kids! He is a good hunter and loyal companion. |
| 42 | dogs | 2 | Image | dog2.jpg |
| 43 | dogs | 2 | Training | Will sit, come, and fetch. Will not heel or stay. |

The information in record store 104 may be maintained in a markup language, for example, as shown in Table 5. Various rows of Table 5 may be stored individually in text files. For example, rows 1-32 in animalshelter.data; rows 33-43 in dogs.data. Alternatively, all records for the site may be stored in one text file. Instead of conventional text file storage techniques, any conventional database storage technique may be used.

TABLE 5

| Record |
|---|
| <DssItem list= "default" sequence= "0" name= "BGColor">white</DssItem> |
| <DssItem list= "default" sequence= "0" name= "Font">Arial</DssItem> |
| <DssItem list= "default" sequence= "0" name= "ShelterName">Taylor County Animal Shelter</DssItem> |
| <DssItem list= "default" sequence= "0" name= "Logo">logo.jpg</DssItem> |
| <DssItem list= "default" sequence= "0" name= "Address1">123 Main</DssItem> |
| <DssItem list= "default" sequence= "0" name= "Address2">P.O. Box 569</DssItem> |
| <DssItem list= "default" sequence= "0" name= "CityStateZip">Medford, WI 54451 </DssItem> |
| <DssItem list= "default" sequence= "0" name= "Phone">(715) 748-1234</DssItem> |

TABLE 5-continued

| Record |
| --- |
| <DssItem list= "default" sequence= "0" name= "Email"> pets@generic.com</DssItem><br><DssItem list= "default" sequence= "0" name= "Hours">Mon-Fri 8 to 5<br></DssItem><br><DssItem list= "default" sequence= "0" name= "WelcomeMsg">Visit us at the Mall. Donations welcome!</DssItem><br><DssItem list= "default" sequence= "0" name= "Title">Pet Of The Week</DssItem><br><DssItem list= "default" sequence= "0" name= "PrizePetLink">http://127.0.0.1/cgi-bin/dss/dss.pl?PrizePetEdit.dss</DssItem><br><DssItem list= "default" sequence= "0" name= "PrizePetList">dogs</DssItem><br><DssItem list= "default" sequence= "0" name= "PrizePetSeq">2</DssItem><br><DssItem list= "navigation" sequence= "1" name= "MenuItem">Home</DssItem><br><DssItem list= "navigation" sequence= "1" name= "MenuReference">animalshelter.dss</DssItem><br><DssItem list= "navigation" sequence= "2" name= "MenuItem">Dogs</DssItem><br><DssItem list= "navigation" sequence= "2" name= "MenuReference">dogs.dss</DssItem><br><DssItem list= "navigation" sequence= "3" name= "MenuItem">Cats</DssItem><br><DssItem list= "navigation" sequence= "3" name= "MenuReference">cats.dss</DssItem><br><DssItem list= "dogsdetails" sequence= "1" name= "Detail">Name</DssItem><br><DssItem list= "dogsdetails" sequence= "2" name= "Detail">Breed</DssItem><br><DssItem list= "dogsdetails" sequence= "3" name= "Detail">Age</DssItem><br><DssItem list= "dogsdetails" sequence= "4" name= "Detail">Text</DssItem><br><DssItem list= "dogsdetails" sequence= "5" name= "Detail">Image</DssItem><br><DssItem list= "dogsdetails" sequence= "6" name= "Detail">Training</DssItem><br><DssItem list= "catsdetails" sequence= "1" name= "Detail">Name</DssItem><br><DssItem list= "catsdetails" sequence= "2" name= "Detail">Breed</DssItem><br><DssItem list= "catsdetails" sequence= "3" name= "Detail">Age</DssItem><br><DssItem list= "catsdetails" sequence= "4" name= "Detail">Text</DssItem><br><DssItem list= "catsdetails" sequence= "5" name= "Detail">Image</DssItem><br><DssItem list= "dogs" sequence= "1" name= "Name">Bubba</DssItem><br><DssItem list= "dogs" sequence= "1" name= "Breed">Mix</DssItem><br><DssItem list= "dogs" sequence= "1" name= "Age">3 Months</DssItem><br><DssItem list= "dogs" sequence= "1" name= "Text">Bubba is a happy little dog who LOVES to play. He's very affectionate. He doesn't bark and sheds very little.</DssItem><br><DssItem list= "dogs" sequence= "1" name= "Image">dog1.jpg</DssItem><br><DssItem list= "dogs" sequence= "2" name= "Name">Jake</DssItem><br><DssItem list= "dogs" sequence= "2" name= "Breed">Black Labrador</DssItem><br><DssItem list= "dogs" sequence= "2" name= "Age">1 Year</DssItem><br><DssItem list= "dogs" sequence= "2" name= "Text">Jake loves kids! He is a good hunter and loyal companion.</DssItem><br><DssItem list= "dogs" sequence= "2" name= "Image">dog2.jpg</DssItem><br><DssItem list= "dogs" sequence= "2" name= "Training">Will sit, come, and fetch. Will not heel or stay.</DssItem> |

Generally, each template is a DSS-document as described above in Table 2 with attributes per Tables 1 and 3. Prepared pages 107 include substituted text for DSS-document-elements and/or substituted text for attribute-and-value items. Prepared pages 107 further suitably include key-values as attribute-values. Entry/edit messages 133 include key-values as parameter-names and named-values as parameter-values, as discussed above.

TABLE 6

| For Page | Template |
| --- | --- |
| 200 | <DssData><DssFile name= "animalshelter.data"></DssData><DssDisplay><html><br><body bgcolor=<DssItem list= "default" sequence= "0" name= "BGColor">><br><center><table width=100%><tr><td><img src= "images/<DssItem list= "default" sequence= "0" name= "Logo">"></td><td><center><font face=<DssItem list= "default" sequence= "0" name="Font"> size=7><DssItem list= "default" sequence= "0" name= "ShelterName"></font></center></td></tr></table><br><font face=<DssItem list= "default" sequence= "0" name= "Font"> size=2><br><DssItem list= "default" sequence= "0" name= "WelcomeMsg"></font></center><hr><br><table cellspacing=10 width=100%><tr><td valign=top width=200><br><font face=<DssItem list= "default" sequence= "0" name= "Font"> size=2><br><DssItems list= "navigation"><br><a href= "dss.pl?<DssItem name= "MenuReference">"><DssItem name= "MenuItem"></a><br></DssItems><br><br><hr><br><DssItem list= "default" sequence= "0" name= "Address1"><br><br><DssItem list= "default" sequence= "0" name= "Address2"><br><br><DssItem list= "default" sequence= "0" name= "CityStateZip"><br><br><DssItem list= "default" sequence= "0" name= "Phone"><br><br><DssItem list= "default" sequence= "0" name= "Hours"><br><br><a href=mailto:<DssItem list= "default" sequence= "0" name= "Email">><br><DssItem list= "default" sequence= "0" name= "Email"></a><br></font><br><br></td><td width=*><center><font face=<DssItem list= "default" sequence= "0" name= |

TABLE 6-continued

| For Page | Template |
|---|---|
|  | "Font"> size=4><DssItem list= "default" sequence= "0" name= "Title"></font><br><br><font face=<DssItem list= "default" sequence= "0" name= "Font"> size=2>Hi, I'm<br><DssItem list= "<DssItem list= "default" sequence= "0" name= "PrizePetList">"<br>sequence= "<DssItem list= "default" sequence= "0" name= "PrizePetSeq">"<br>name= "Name">. Click my picture!</font><br><br><a href= "<DssItem list= "default" sequence= "0" name= "PrizePetLink">&<br><DssItem list= "default" sequence= "0" name= "PrizePetList">.data_<br><DssItem list= "default" sequence= "0" name= "PrizePetList">_<br><DssItem list= "default" sequence= "0" name= "PrizePetSeq">"><br><img width=120 height=100 src= "images/<DssItem list=<br>"<DssItem list= "default" sequence= "0" name= "PrizePetList">" sequence= "<DssItem<br>list= "default" sequence= "0" name= "PrizePetSeq">"<br>name= "Image">"></a></center></td></table></body></html></DssDisplay> |
| 300 | <DssData><DssFile name= "animalshelter.data"><DssFile name= "dogs.data"><br></DssData><DssDisplay><html><br><body bgcolor=<DssItem list= "default" sequence= "0" name= "BGColor"> ><br><center><table width=100%><br><tr><td><img src= "images/<DssItem list= "default" sequence= "0" name=<br>"Logo">"></td><td><br><center><font face=<DssItem list= "default" sequence= "0" name= "Font"><br>size=7><DssItem list= "default" sequence= "0" name= "ShelterName"></font></center><br></td></tr></table><br><font face=<DssItem list= "default" sequence= "0" name= "Font"> size=2><DssItem<br>list= "default" sequence= "0" name= "WelcomeMsg"></font></center><hr><br><table cellspacing=10 width=100%><br><tr><td valign=top width=200><br><font face=<DssItem list= "default" sequence= "0" name= "Font"> size=2><br><DssItems list= "navigation"><br><a href= "dss.pl?Admin<DssItem name= "MenuReference">">[Edit]</a><br><a href= "dss.pl?<DssItem name= "MenuReference">"><br><DssItem name= "MenuItem"></a><br></DssItems><br><br><hr><br></font><br></td><td width=*><br><center><font face=<DssItem list= "default" sequence= "0" name= "Font"><br>size=4><DssItem list= "default" sequence= "0" name= "Title"></font><br><br><img width=120 height=100 src= "images/<DssItem list= "dogs" sequence= "<DssItem<br>list= "default" sequence= "0" name= "PrizePetSeq">" name= "Image">"></td><br></table></center><form method= "post" action= "DSS_Update.pl"><br><pre>Title <input type=text size=50 name=<DssItem@ name= "Title"><br>value= "<DssItem list= "default" sequence= "0" name= "Title">"><br>Page <input type=text size=50 name=<DssItem@ name= "PrizePetList"><br>value= "<DssItem list= "default" sequence= "0" name= "PrizePetList">"><br>Number <input type=text size=50 name=<DssItem@ name= "PrizePetSeq"><br>value= "<DssItem list= "default" sequence= "0" name= "PrizePetSeq">"><br><input type=submit value= "Update"></form><br><form method= "post" action= "DSS_Update.pl"><pre><DssItems list=<br>"<DssItem list= "default" sequence= "0" name= "PrizePetList">details"><br><DssItem name= "Detail"><br><input type=text size=50<br>name= "<DssItem@ list= "<DssItem list= "default" sequence= "0" name=<br>"PrizePetList">" name= "Detail">"<br>value= "<DssItem list= <DssItem list= "default" sequence= "0" name= "PrizePetList"><br>sequence= "<DssItem list= "default" sequence= "0" name= "PrizePetSeq">"<br>name= "<DssItem name= "Detail">">"></DssItems><br></pre><input type=submit value= "Update"></form></body></html></DssDisplay> |

The results of composing pages based on templates of Table 6 are described in Table 7.

TABLE 7

| Page | Result of Composing |
|---|---|
| 200 | <html><body bgcolor=white ><center><table width=100%><br><tr><td><img src= "images/logo.jpg"></td><td><br><center><font face=Arial size=7>Taylor County Animal Shelter</font><br></center></td></tr></table><br><font face=Arial size=2>Visit us at the Mall. Donations welcome!</font><br></center><hr><table cellspacing=10 width=100%><br><tr><td valign=top width=200><font face=Arial size=2><br><a href= "dss.pl?animalshelter.dss">Home</a><br><br><a href= "dss.pl?dogs.dss">Dogs</a><br><br><a href= "dss.pl?cats.dss">Cats</a><br><br><hr> |

TABLE 7-continued

| Page | Result of Composing |
|---|---|
| | 123 Main<br>P.O. Box 569<br>Medford, WI 54451<br>(715) 748-1234<br>Mon-Fri 8 to 5<br><a ref=mailto:pets@generic.com> pets@generic.com</a><br></font><br></td><td width=*><center><font face=Arial size=4>Pet Of The Week</font><br><font face=Arial size=2>Hi, I'm Jake. Click my picture!</font><br><a href= "http://127.0.0.1/cgi-bin/dss/dss.pl?PrizePetEdit.dss&dogs.data__dogs__2"><img width=400 height=300 src= "images/dog2.jpg"></a></center></td></table></body></html> |
| 300 | <html><body bgcolor=white ><center><table width=100%><tr><td><img src= "images/logo.jpg"></td><td><center><font face=Arial size=7>Taylor County Animal Shelter</font></center></td></tr></table><font face=Arial size=2>Visit us at the Mall. Donations welcome!</font></center><hr><table cellspacing=10 width=100%><tr><td valign=top width=200><font face=Arial size=2><a href= "dss.pl?Adminanimalshelter.dss">[Edit]</a><a href= "dss.pl?animalshelter.dss">Home</a><br><a href= "dss.pl?Admindogs.dss">[Edit]</a> <a href= "dss.pl?dogs.dss">Dogs</a><br><a href= "dss.pl?Admincats.dss">[Edit]</a> <a href= "dss.pl?cats.dss">Cats</a><br><br><br><hr></font><br></td><td width=*><center><font face=Arial size=4>Pet Of The Week</font><br><img width=120 height=100 src= "images/dog2.jpg"></center><form method= "post" action= "DSS_Update.pl"><pre>Title < input type=text size=50 name= animalshelter.data__default__0__Title value= "Pet Of The Week"><br>Page < input type=text size=50 name= animalshelter.data__default__0__PrizePetList value= "dogs"><br>Number < input type=text size=50 name= animalshelter.data__default__0__PrizePetSeq value= "2"></pre><input type=submit value= "Update"></form><br><form method= "post" action= "DSS_Update.pl"><pre>Name <input type=text size=50 name=dogs.data__dogs__2__Name value= "Jake"><br>Breed <input type=text size=50 name=dogs.data__dogs__2__Breed value= "Black Labrador"><br>Age <input type=text size=50 name=dogs.data__dogs__2__Age value= "1 Year"><br>Text <input type=text size=50 name=dogs.data__dogs__2__Text value= "Jake loves kids! He is a good hunter and loyal companion."><br>Image <input type=text size=50 name= dogs.data__dogs__2__Image value= "dog2.jpg"><br>Training <input type=text size=50 name= dogs.data__dogs__2__Training value= "Will sit, come, and fetch. Will not heel or stay."></pre><input type=submit value= "Update"></form></body></html> |

The site described above is maintained by server 110. In operation, a user of client 140 requests (143) a home page (200 of FIG. 2) from the site (102, 104) sponsored by the animal shelter. In response to the request, server 110 activates processes (106, 108) in any conventional manner to compose home page 200 from a template and from data from a record store. As discussed above, compose process 106 prepares a page 107 and correspond process 108 sends a corresponding page 109 to client 140. In this simple example site, the user clicking on picture 206 requests (143) an edit page (300 of FIG. 3) to select the featured pet and to edit the description of the featured pet.

After editing values in input text boxes 311-313, the user clicks on update button 314. In response to user input, browser 142 prepares an HTTP POST message 133. Correspond process receives the POST message 111 and passes information 113 to decompose process 114. Information 113 typically includes a parametric expression having a named-value, such as a key and replacement text. The POST message is described in Table 8. Consequently, decompose process 114 updates values in record store 104. For example, the featured pet may be changed from dog number 2 from the page of dogs.data to cat number 4 from the page of cats.data (not shown).

TABLE 8

POST Message

POST /cgi-bin/dss/dss.pl HTTP/1.0
[other conventional header information omitted for clarity]
dogs.data__default__0__Title=Most+popular+pet& dogs.data__default__0__PrizePetList=dogs&
dogs.data__default__0__PrizePetSeq=2

After editing values in input text boxes 315-320, the user clicks on update button 322. In response to user input, browser 142 prepares an HTTP POST message 133. As before, correspond process receives the POST message 111 and passes information 113 to decompose process 114. The POST message is described in Table 9. Consequently, decompose process 114 updates values in record store 104. For example, the dog's name (i.e., the record corresponding to row 38 of Table 4) is changed from "Jake" to "Djayk".

TABLE 9

POST Message

POST /cgi-bin/dss/dss.pl HTTP/1.0
[other conventional header information omitted for clarity]

TABLE 9-continued

POST Message dogs.data_doges_2_Name=Djayk& dogs.data_doges_2_Breed=Dalmatian&
dogs.data_doges_2_Age=2+Years& dogs.data_doges_2_Text=He's+so+cute!&
dogs.data_doges_2_Image=dogs2.jpg&
dogs.data_doges_2_Training=Will+heel,+sit,+stay,+and+come.

In an alternate implementation, data from the forms discussed above is provided to server 110 by a suitable HTTP GET command as specified according to the GET method of each form element.

Figure 2:
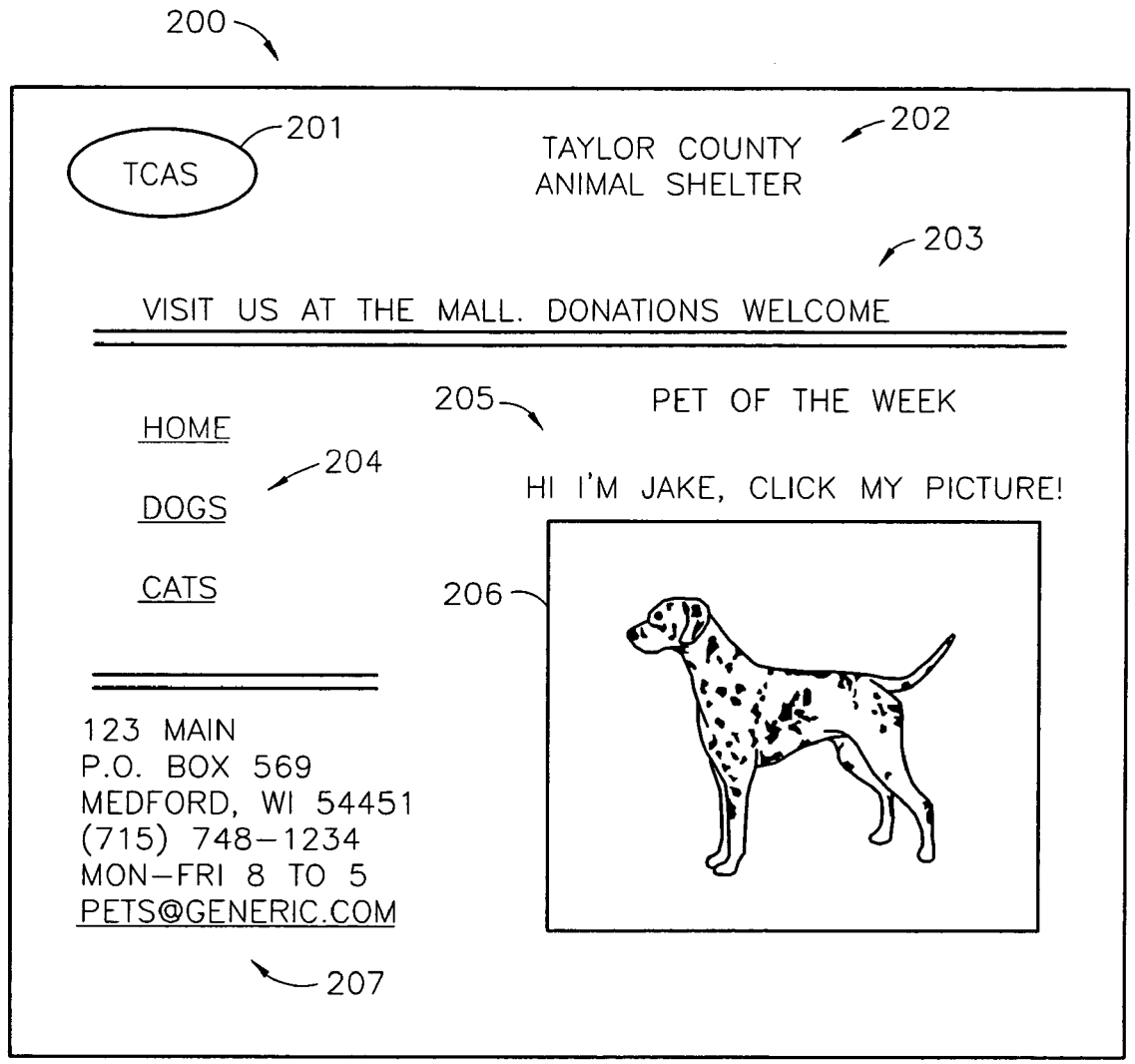
FIG. 2 is a plan view of a home page provided by the server and browse process of the system of FIG. 1.

Home page 200 of FIG. 2 includes seven regions for the presentation of content. Region 201 presents a logo 201. Region 202 presents the sponsor's name. Region 203 presents a welcome message. Region 204 presents a menu of links to other pages of the site (not shown). Region 205 presents a caption describing region 206. Region 206 presents a picture of a featured pet with a link to edit page 300 of FIG. 3. Region 207 presents the sponsor's contact information.

Figure 3:
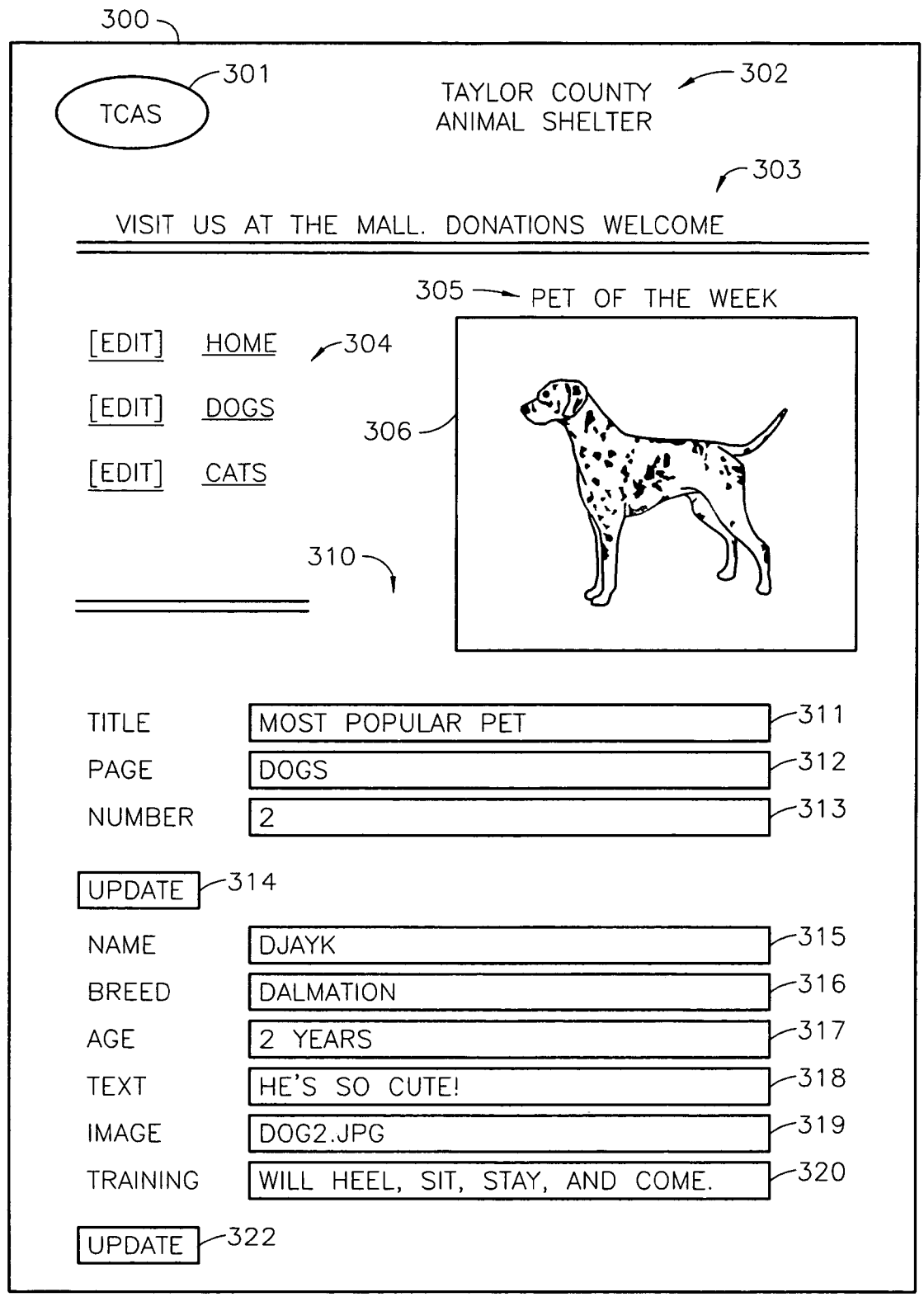
FIG. 3 is a plan view of an edit page provided by the server and browse process of the system of FIG. 1.

View page 300 of FIG. 3 includes six regions 301-306 for presentation of content and one region 310 for user entry/edit of named values. Regions 301-303 corresponding to regions 201-203. On clicking any link in region 204, or clicking the corresponding link in region 304, a suitable view page is prepared and presented to the user. In region 304, "[EDIT]" links lead to the presentation of a suitable edit page. An edit page, for example, provides a mechanism for user selection of a particular pet and editing of that pet's description. Each underlying view page and edit page related to an "[EDIT]" link is implemented using DSS language constructs of the type discussed herein.

The look and feel of the site is controlled by sole authority records. According to one aspect of the present invention, update of content for regions in common among several templates (e.g., 201-203 and 301-303) is accomplished by conveniently updating various sole authority records of store 104 (e.g. rows 3, 4, and 11 of Table 4), as opposed to editing the text of several independent templates. Further, an unlimited number of artistic features of the site may be specified in sole authority records of store 104 (e.g., background color and font) and referred to in templates to simplify assuring a uniform look of the site and to simplify updating the look of the site. Although only background color and font are specified (e.g., rows 1-2 of Table 4), any number of named values may be used.

The feel of the site is maintained uniform, according to various aspects of the present invention, by avoiding referring in a template to particular items of a group when a reference to the group is logically sufficient. Consequently, the group is identified by list-name and/or sequence-number in store 104; and, details of particular items of the group and/or sequence are stored in one or more sole authority records of store 104. For example, menus in regions 204 and 304 are maintained uniform in templates 200 and 300 without reference to particular menu items. Further, reference to the description of a pet in region 310 is made without reference in template 300 to particular items of that description.

Consistency and simplicity of expansion are gained by use of Dss-elements according to various aspects of the present invention. As to consistency, note that region 304 presents the same menu of links as presented in region 204; and, the menu texts and links are specified only once in store 104. As to simplicity of expansion, if it is desired to add another menu item, it is not necessary to edit template 200 or 300. The desired menu item text and link are merely added to store 104.

Template design is simplified by use of nested Dss-document-elements. For example, templates 200 and 300 include Dss-paired-elements using different DssItems start-tags. Each respective DssItems start tag has attribute-values specified by another (i.e., nested) Dss-document-element. In the case of region 204, text substitution provides links to a PERL script on server 110 that are called with a parameter whose value directs processing according to the menu selection (e.g., menu item CATS links to dss.pl?cats.dss). As shown, the same PERL script (dss.pl) is called for each menu item. In an alternate implementation, text substitution is used to compose a different PERL script for each menu item and PERL script parameters are omitted, (e.g., CATS links to cats.pl).

Caption 205 includes data accessed directly from store 104 via one respective Dss-document-element per access. In caption 205, the distinction earned by the featured pet is provided by text substitution with a direct reference to a value-name (Title) in store 104 (e.g., animalshelter.data). The direct reference is made using a Dss-document-element called DssItem.

Caption 205 also includes data accessed indirectly from store 104 via a Dss-document-element that includes two other Dss-document-elements. Generally, indirection uses a named value from a first record to access another record. In caption 205, the name of the featured pet is provided by text substitution with an indirect reference to the pet name (corresponding to row 38 of Table 4). The reference is indirect due to the fact that the featured pet is a member of a specified group (either the dogs or cats lists); and, the description of the featured pet is a specified subgroup (sequence number) of that group. As shown in Table 6 for the name of the featured pet, DssItem elements appear as attribute values (one for list and one for sequence) in a surrounding DssItem element.

Region 310 includes titled entry/edit text boxes 311-313, a first update button 314, titled entry/edit boxes 315-320 and a second update button 322. Entry/edit text boxes initially present the current named value of each respective value name. The titles need not correspond to the value names (e.g., PrizePetList is titled PAGE). As shown, entry/edit text boxes include revised text not yet posted to store 104. The revised text differs from current values (e.g., corresponding rows 12, 38-41, and 43 of Table 4).

Reference to the description of the featured pet in region 310 (i.e., Name, Breed, Age, Text, Image, and Training) is accomplished in template 300 by referring to a group, referring to a subgroup, and by making indirect reference to each detail of the subgroup. The group is identified by the list attribute in the DssItems element (dogsdetails). In the first appearing DssItem@ element, the group is implied by the list attribute of the prior DssItems element (dogsdetails). A list attribute is specified in a later appearing DssItem@ element to override that context. In particular, a different group (dogs) is specified when referring to each item's value. Indirect references are made through items of another list (default) which specifies the featured pet group (PrizePetList) and subgroup (PrizePetSeq) values. By making indirect references, the featured pet is stored in store 104 in sole authority records without duplication of information. Templates do not need to be revised when the identity of the featured pet is changed, for example, from a dog to a cat. By describing the featured pet in template 300 with a reference to a group (as opposed to literally naming each detail) the number of details for different pets (e.g., dogsdetails and catsdetails) is controlled by sole authority records in store 104 without duplication of information. The number of details may vary.

A pet description entry/edit page (not shown) may appear and function in a manner similar to regions 306 and 310 discussed above. In one implementation, additional buttons are included for adding a new pet, clearing the form, and deleting the current pet.

Figure 4:
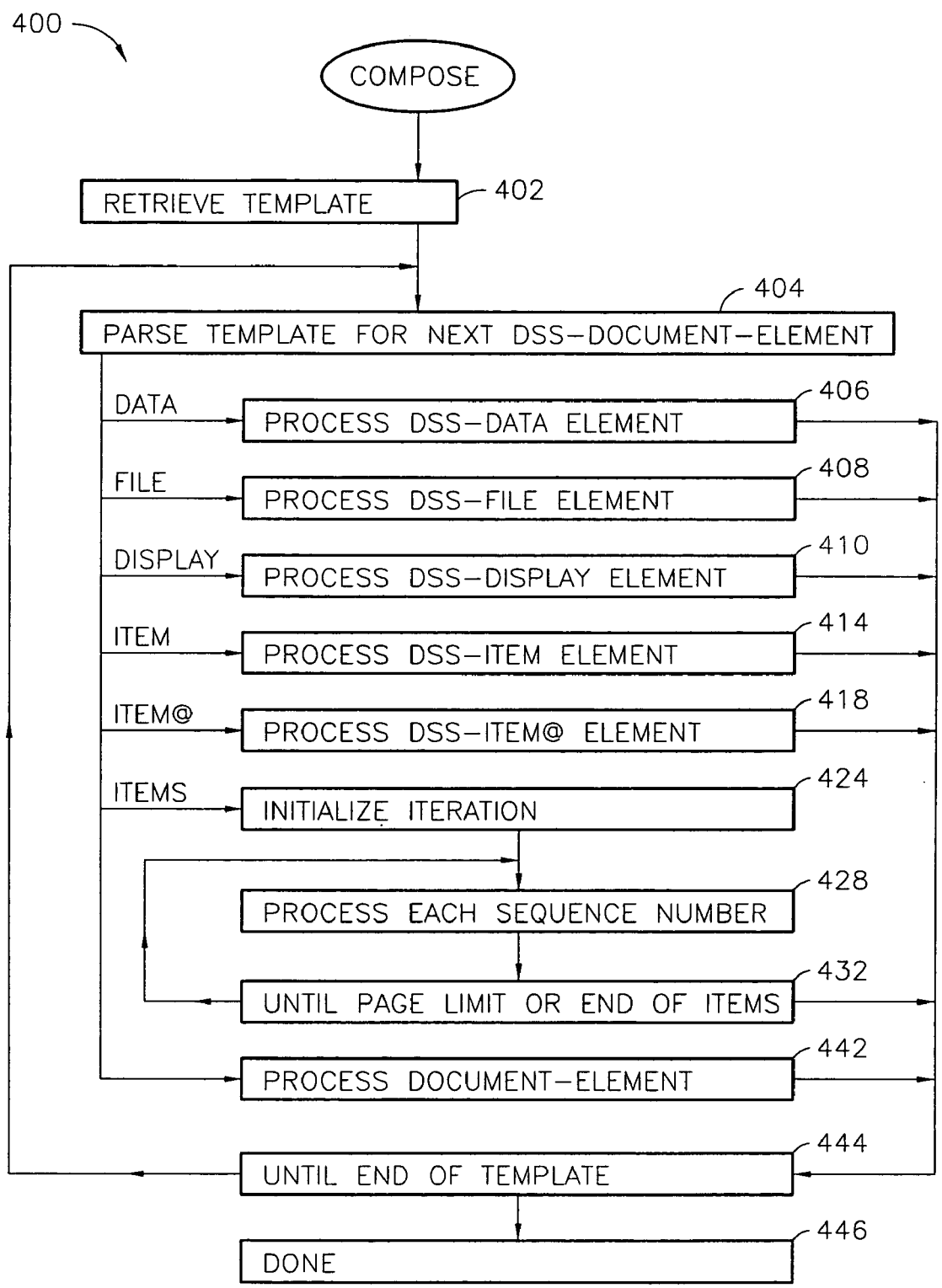
FIG. 4 is a functional flow diagram for a method performed by a compose process of the system of FIG. 1.
Figure 5:
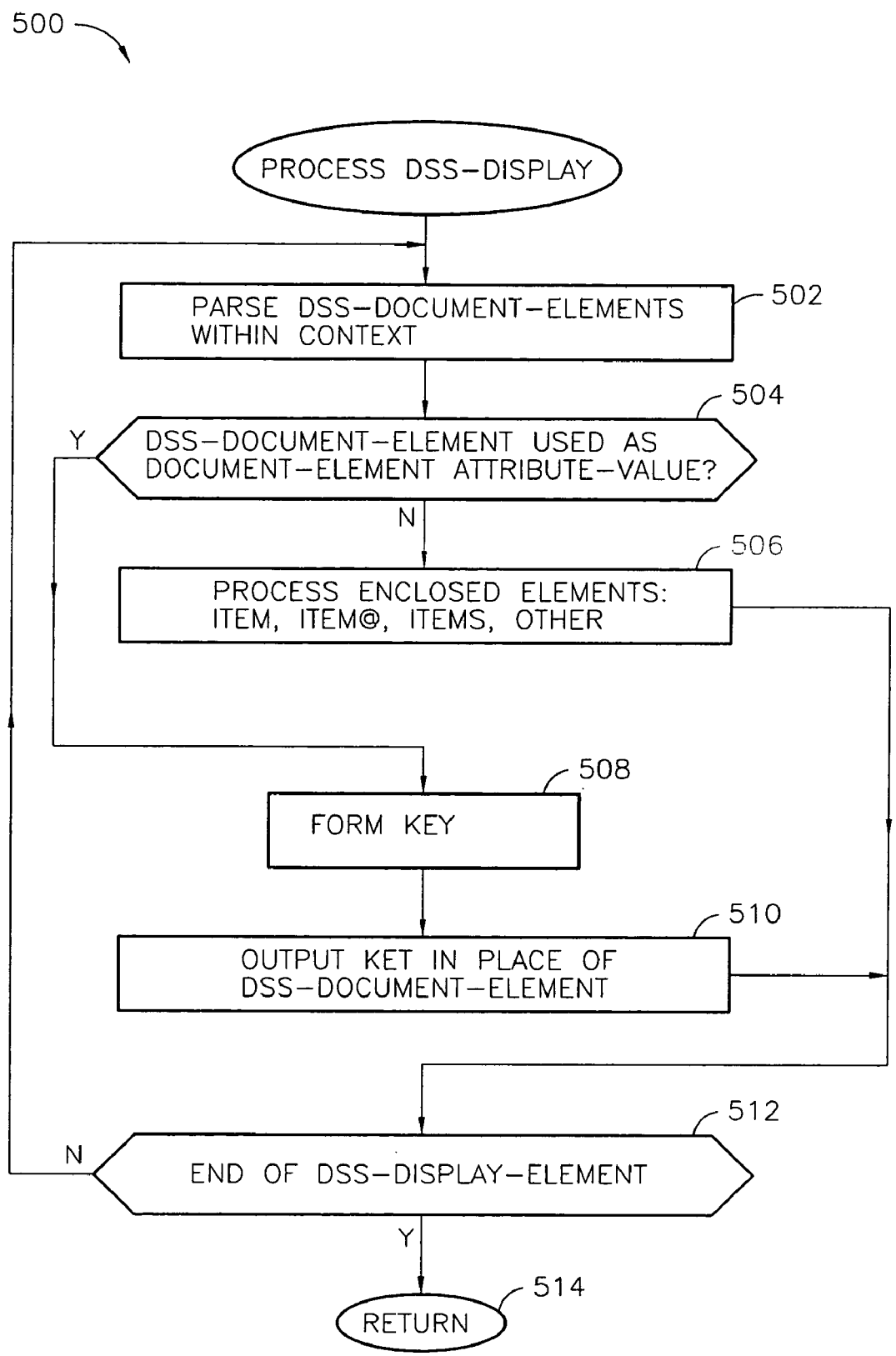
FIG. 5 is a functional flow diagram for an alternate method performed in block 410 of FIG. 4.

A compose method 400 of FIG. 4 in one implementation of process 106 begins with retrieving a template (402). The template is parsed. Parsing includes a serial search of the template. When the template is stored in a hierarchical tree organization (e.g., a DOM), parsing may proceed node-to-node. For the discussion that follows, a template in markup text is presumed for clarity of presentation. To parse the template in markup text, each DSS-document-element is processed in a loop (404 through 444). Parsing identifies seven cases (406, 408, 410, 414, 418, and 442) according to the tag-name of the start-tag of the DSS-document-element. Each case invokes a respective process.

To process (406) a DSS data element, a context is defined for the next DSS display element. The context being defined may be nested within a prior context. The scope of the context extends to all DSS display elements occurring up to the next DSS data element. In an alternate implementation, the DSS data element encloses all Dss display elements that it affects. In the preferred implementation, the DSS data element in total precedes all DSS display elements that it affects. The context may include any conventional HTML or XML document elements. Typically, the context includes one or more DSS file elements to identify, override, and/or supplement use of a default record store.

To process (408) a DSS file element, a portion of the record store is identified as specified in the element with reference to any prior context or default values (e.g., completing a system pathname when only a partial path is specified). The identified records are to be used in resolving DSS elements within the scope of the context (406). Typically, only one DSS file element occurs in a context. When multiple DSS file elements are encountered, the records so indicated are searched (or indexed) with regard to the order in which the DSS file elements were encountered. Modularity in record stores may be implemented as desired for grouping site functions into modules of records. All referenced records may be added to one record store in any conventional manner.

To process (410) a DSS display element, in one implementation, an indication that the page contains elements in the DSS language is added to the output page. This indication may be useful for browsers having functions specific to DSS language elements that may be present in the composed page. The DSS display element may be passed to the output so that the composed page includes one or more of "<Dss-Display>" and "</DssDisplay>" tags. In the example site discussed above, a conventional browser is used in each client, no DSS tags remain in the composed page, and therefore, no indication of DSS language elements is provided in the composed page.

To process (414) a DSS item element, the named-value to which its attribute-and-value tuples (if any) refer (by default, partial specification, or full specification) is recalled from the record store specified by the context. The recalled named-value is then output in place of the DSS item element. For example, when <Dss-item list="dogs", sequence="1", name="Age"> is encountered in the template, "3 Months" (row 35 of Table 4) is output in the composed page.

To process (418) a DSS-item@ element, a corresponding key that includes a value-name is determined from context including the attribute-and-value tuples of the DSS-item@ element. The key is then output in place of the DSS item element. For example, when <Dss-item@ name="Age"> is encountered in the template, "Age" is output in the composed page. In another implementation, the output includes a qualified value-name, for example, "dogs_1_Age". In a preferred implementation, the output includes a fully qualified value-name, for example, dogs.data_dogs_1_Age". The extent of qualification may be part of the context defined by other DSS elements (e.g., DSS display).

Context is provided by a preceding or enclosing Dss-document-element; or, by attributes of the Dss-document-element being parsed. For example, in a Dss-item@ element a filename may be provided by a preceding Dss-file element. A List-Name may be provided by an enclosing Dss-items element, or by a list attribute in the DSS-item element. A Sequence-Number may be provided by operation of a DSS-items element. The parser may track the most recently referred to file, list, and/or sequence number; and, resolve omitted specifications in a manner of the type used for scope of variable sin a block-structured programming language (e.g., ALGOL).

To process (424-432) a DSS items element, iteration control variables are set (424) to initial values. The loop control variable is set to the starting sequence-number (or a default value) as provided by an attribute-value in the DSS-items element. For each value (428) of the loop control variable (e.g., the current sequence-number), the element(s) within the scope of the DSS items element are evaluated (e.g., a recursive call to DSS display element parsing (500)). The attribute-values of the DSS-items element (e.g., list) provide additional context for evaluation of DSS document elements. After evaluation, document-element(s) are output having named-values in accordance with the current sequence-number. Repetition continues until (432) the loop control variable is incremented past the page size limit specified in an attribute-value of the DSS items element (if any), a default value is reached, or the last sequence-number of the group has been processed.

To process (442) all other document elements that are not DSS standalone elements or DSS paired elements as processed in cases discussed above (406, 408, 410, 414, 418, or 424), the document element is passed to the output (442) without text substitution.

After determining (444) that the end of the template has been reached, method 400 is complete (446) and ready for new input. In the implementation discussed above, DSS display elements are not nested, simplifying the parsing function (404).

In an alternate method, DSS display elements provide context within which other DSS elements are processed. The context may be supplemented by nesting a DSS display element within an enclosing DSS display element. Processing a DSS display element according to method 500 begins with parsing (502) the DSS display element's enclosed text in a loop (502-512). Parsing seeks to identify DSS document elements, output substituted text in place of these elements, and pass all other document elements unchanged to the output. References to a record store are resolved with reference to the context (406, 408) as discussed above.

A DSS document element may be encountered in a semantic context as a standalone element, as a paired element, or as an attribute value. If (504) the DSS document element is encountered in a semantic context as an attribute value of a document element (as opposed to an attribute-value of a DSS-standalone-element or a DSS-paired-element), processing continues as described below (508). Otherwise, parsing identifies four cases according to the tag-name of the start-tag of the DSS-document-element. Each case is processed as discussed above: DSS item elements (414), DSS item@ elements (418), DSS items elements (424-432), and other non-DSS elements (442). If nesting of DSS display elements is supported, a fifth case for processing DSS display elements (500) is implemented with recursion.

If the DSS document element was encountered (512) in a context as the attribute-value of a document element, a key is formed (508) and output (510) in place of the DSS document element. For example, when <input type="text" name="<DssItem@ list"dogs", sequence="1", name="Age">> is encountered in the template, "<input type="text" name="dogs_1_Age">" is output in the composed page. By preparing and outputting a key, an HTTP POST message may then be formed by browse process 142, for example, "dogs_1_Age=2 Years" as specified in an edit by the user. Proper parsing recognizes that the DSS document-element occurs in the context of another document element. In other words, parsing may proceed to recognize a first start-tag of a first document element (e.g., "input"). The first start-tag may have an attribute-and-value (e.g., "name"). The value may include a second start-tag of a second document element (e.g., "DSS-item@"). The second start-tag may also have attribute-and-value tuples (e.g., "list", "sequence", and "name"). The attribute-values of the second start-tag are used to form the key. The context of the first start-tag (or context of an attribute-and-value) signals the parser that a key is to be formed (508) and output (510) as opposed to looking up a value (e.g., 3 Months) to be output (506).

After output has been defined for the encountered document element, it is determined whether the end of the DSS display element has been reached (512). If so, control returns (514) to the calling process. Otherwise, processing continues to parse DSS document elements (502).

After context has been defined and/or output has been provided for the encountered DSS-document-elements (606, 608, 640, 642) it is determined whether the end of the template has been reached (644). In not, processing continues with parsing (604) of the next DSS-document-element. If so, then composing is complete (646).

An implementation of method 400 that includes method 500 in place of case 410 omits cases 414, 418, and 424 from loop 404-444. The functions of the omitted cases are performed within block 506 as discussed above.

An implementation of method 400 that accounts for use of a document-element as an attribute-value as discussed above (504, 506, 508, 510) may include functions similar to 504, 508, and 510 in each case 414, 418, and/or 424.

Figure 6:
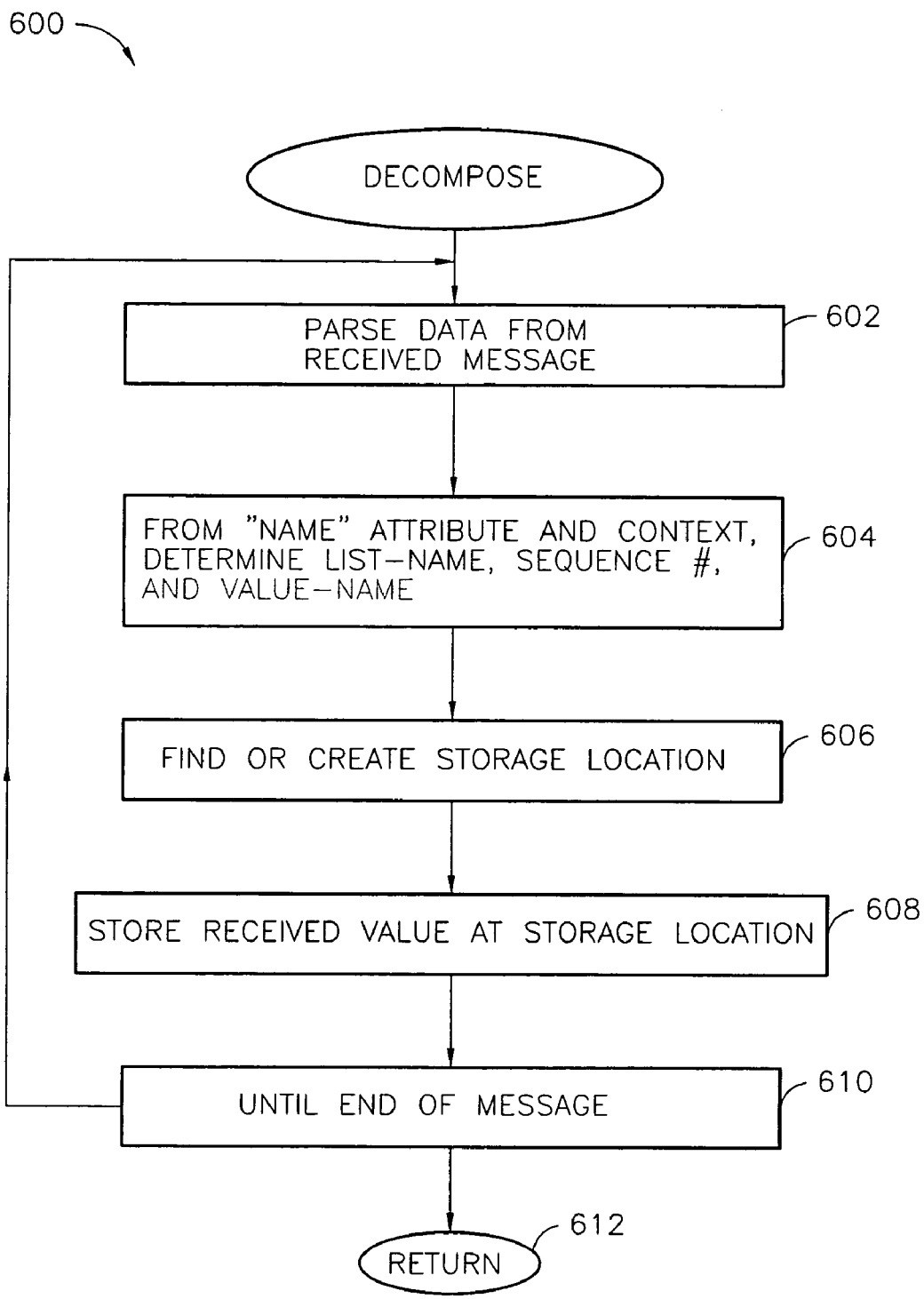
FIG. 6 is a functional flow diagram for a method performed by a decompose process of the system of FIG. 1.

A decompose method 600 of FIG. 6 in one implementation of process 114 begins with parsing (602) data received from client 140 in a message. It is determined from a "name" attribute and context the fields and values for accessing record store 104, for example, List-Name, Sequence-Number, and Value-Name as in Table 4. The context may identify a particular record store or a portion (e.g., group of records) of a record store to be accessed. A storage location in the record store is then found or created (606). Finally, the received value is stored (608) at the found or created storage location. Decomposition continues in a loop (602-610) until (610) the end of the message is reached.

Figure 7:
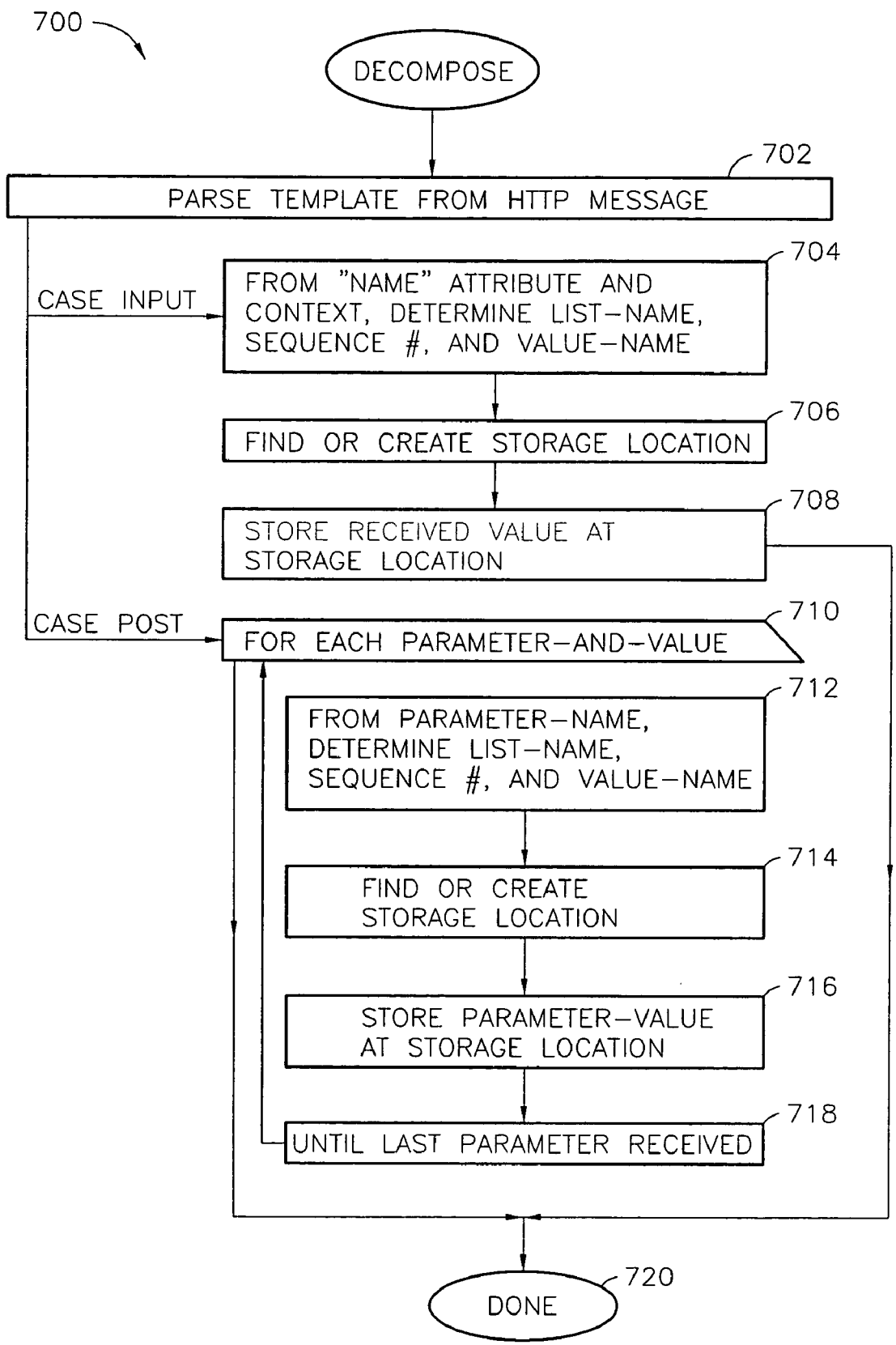
FIG. 7 is a functional flow diagram for a method performed by an alternate decompose process of the system of FIG. 1.

A decompose method 700 of FIG. 7 in another implementation of process 114 begins with parsing (702) data received from client 140 in a message. The structure and content of the message are analyzed in any conventional manner to determine whether the message is an HTTP INPUT message (e.g., a link to be followed) or an HTTP POST message (e.g. user specified entry/edit data).

For an INPUT message, parsing continues to identify an attribute-value tuple having the name "name" and a key as a value. The key is analyzed according to an expected structure. The structure of the key may correspond to a concatenated series of: (a) the intended list-name; (b) an underscore; (c) the intended sequence-number; (d) an underscore; and (e) the intended value-name. The key is then used in a query of record store 104. If the key does not locate a record, then a record may be created (706). Otherwise, the value associated with the INPUT message (i.e., the value entered by the user) is stored (708) at the record identified by the key and specifically in the named-value field (e.g., corresponding to Named-Value of Table 4).

For a POST message, parsing continues to identify one or more parameter-and-value tuples. For each such tuple (710), the parameter-name is analyzed to determine a key as discussed above with reference to 704. Storage for a new or replacement value is found or created (714) in the manner described with reference to 706. The value, associated with the parameter-name, the key, and ultimately the fully qualified value name, is stored (716) at the storage location determined in 714 and specifically in the named-value field. Each parameter-and-value tuple is processed in turn until all have been processed (718).

After storage of the named-value(s) (708 or 718), the decompose process is complete (720).

The forgoing description discusses preferred embodiments of the present invention which may be changed or modified without departing from the scope of the present invention as defined in the claims. While for the sake of clarity of description, several specific embodiments of the invention have been described, the scope of the invention is intended to be measured by the claims as set forth below.

What is claimed is:

1. A method performed by a server, the method comprising:
    parsing a provided template according to a markup language, the template including a start tag comprising an attribute value, parsing being performed to determine a value name from the attribute value by identifying a set of elements that form a unique key, wherein the set of elements include a group name, a subgroup name, and a sequence element;
    forming the unique key comprising the value name;
    retrieving a value from a data store using the unique key;
    substituting the retrieved value from the data store for the set of elements forming the unique key in the markup-language template;
    preparing a data object comprising a portion of the template after substituting the value from the data store that was retrieved using the unique key for at least the attribute value; and
    providing the data object to a client of the server.

2. The method of claim 1, further comprising:
    parsing a message received from the client, the message comprising the key and an update value; and
    updating the store in accordance with the update value at a record accessed in accordance with the key.

3. The method of claim 2, wherein the markup language is consistent with XML.

4. The method of claim 3, wherein the key comprises first indicia identifying a group of records of the store, second indicia identifying a subgroup of the group, and third indicia identifying a record of the subgroup.

5. The method of claim 4, wherein:
the record comprises a first field, a second field, and a third field, wherein the first field comprises a first value, the second field comprises a second value; and the third field comprises a third value; and
the key comprises the first value, the second value, and the third value.

6. The method of claim 4, wherein the key comprises a result of concatenation of the first indicia, the second indicia, and the third indicia.

7. The method of claim 6, wherein the message further comprises a parameter name and a parameter value, the parameter name comprising the key.

8. The method of claim 7, wherein:
the store comprises a plurality of value names and a corresponding plurality of named values;
the value name is a member of the plurality of value names; and
the step for updating further comprises a step for assigning the update value as the named value corresponding to the value name.

9. The method of claim 8, wherein:
parsing to determine the value name comprises parsing the attribute value according to the markup language to determine a second start tag and a second attribute value; and
the value name is determined in accordance with the second attribute value.

10. The method of claim 9, wherein parsing to determine a value name comprises:
parsing the attribute value according to the markup language to determine a second start tag; and
parsing the second start tag to determine a second attribute value, a third attribute value, and a fourth attribute value; wherein the value name is determined in accordance with the second attribute value, the third attribute value, and the fourth attribute value.

11. A computer readable medium having instructions stored thereon that, when executed by a suitably programmed information processing system, cause the system to perform a method comprising:
parsing a provided template according to a markup language, the template including a start tag comprising an attribute value, parsing being performed to determine a value name from the attribute value by identifying a set of elements that form a unique key, wherein the set of elements include a group name, a subgroup name, and a sequence element;
forming the unique key comprising the value name;
retrieving a value from a data store using the unique key;
substituting the retrieved value from the data store for the set of elements forming the unique key in the markup-language template;
preparing a data object comprising a portion of the template after substituting the value from the data store that was retrieved using the unique key for at least the attribute value; and
providing the data object to a client of the server.

12. A server comprising:
Processor with memory;
means for parsing a template according to a markup language, the markup language having a start tag comprising an attribute value, parsing being performed to determine a value name from the attribute value by identifying a set of elements that form a unique key, wherein the set of elements include a group name, a subgroup name, and a sequence element;
means for forming the unique key comprising the value name;
means for retrieving a value from a data store using the unique key;
means for substituting the retrieved value from the data store for the set of elements forming the unique key in the markup-language template;
means for preparing a data object comprising a portion of the template after substituting the value from the data store that was retrieved using the unique key for at least the attribute value; and
means for providing the data object to a client of the server.

13. The server of claim 12, further comprising:
means for storing a record;
means for receiving a message comprising a key and an update value; and
means for updating the record accessed in accordance with the key.

14. The server of claim 13, wherein the markup language is consistent with XML.

15. The server of claim 14, wherein the key comprises first indicia identifying a group of records of the means for storing, second indicia identifying a subgroup of the group, and third indicia identifying one record of the subgroup.

16. The server of claim 15, wherein:
the record comprises a first field, a second field, and a third field, wherein the first field comprises a first value, the second field comprises a second value; and the third field comprises a third value; and
the key comprises the first value, the second value, and the third value.

17. The server of claim 16, wherein the key comprises a result of concatenation of the first indicia, the second indicia, and the third indicia.

18. The server of claim 17, wherein the message further comprises a parameter name and a parameter value, the parameter name comprising the key.

19. The server of claim 18, wherein:
the means for storing comprises a plurality of value names and a corresponding plurality of named values;
the value name is a member of the plurality of value names; and
the means for updating further comprises means for assigning the update value as the named value corresponding to the value name.

20. The server of claim 19, wherein:
the means for parsing to determine a value name comprises means for parsing the attribute value according to a markup language to determine a second start tag and a second attribute value; and
the value name is determined in accordance with the second attribute value.

21. The server of claim 20, wherein the means for parsing to determine a value name comprises:
means for parsing the attribute value according to a markup language to determine a second start tag; and
means for parsing the second start tag to determine a second attribute value, a third attribute value, and a fourth attribute value; wherein the value name is determined in accordance with the second attribute value, the third attribute value, and the fourth attribute value.

* * * * *